United States Patent
Yu et al.

(10) Patent No.: US 11,327,355 B2
(45) Date of Patent: May 10, 2022

(54) DISPLAY SUBSTRATE, DISPLAY APPARATUS, AND METHOD OF FABRICATING DISPLAY SUBSTRATE

(71) Applicants: BOE TECHNOLOGY GROUP CO., LTD., Beijing (CN); Hefei BOE Optoelectronics Technology Co., Ltd., Anhui (CN)

(72) Inventors: Shirong Yu, Beijing (CN); Qingyong Meng, Beijing (CN); Chunhui Wu, Beijing (CN)

(73) Assignees: BOE TECHNOLOGY GROUP CO., LTD., Beijing (CN); Hefei BOE Optoelectronics Technology Co., Ltd., Anhui (CN)

( * ) Notice: Subject to any disclaimer, the term of this patent is extended or adjusted under 35 U.S.C. 154(b) by 937 days.

(21) Appl. No.: 16/065,043

(22) PCT Filed: Nov. 16, 2017

(86) PCT No.: PCT/CN2017/111291
§ 371 (c)(1),
(2) Date: Jun. 21, 2018

(87) PCT Pub. No.: WO2018/218881
PCT Pub. Date: Dec. 6, 2018

(65) Prior Publication Data
US 2021/0208453 A1    Jul. 8, 2021

(30) Foreign Application Priority Data
Jun. 1, 2017   (CN) .......................... 201710406158.2

(51) Int. Cl.
G02F 1/1335   (2006.01)
G02B 1/04   (2006.01)
(Continued)

(52) U.S. Cl.
CPC ......... G02F 1/133519 (2021.01); G02B 1/04 (2013.01); G02B 5/28 (2013.01);
(Continued)

(58) Field of Classification Search
CPC ......... G02F 1/133519; G02F 1/133516; G02F 1/133723; G02F 2202/022; G02B 1/04;
(Continued)

(56) References Cited

U.S. PATENT DOCUMENTS 4,779,957 A   10/1988   Suginoya et al.
5,042,920 A    8/1991   Yoshino et al.
(Continued)

FOREIGN PATENT DOCUMENTS

CN    1880982 A    12/2006
CN    101819348 A    9/2010
(Continued)

OTHER PUBLICATIONS

First Office Action in the Chinese Patent Application No. 201710406158.2, dated Apr. 30, 2019; English translation attached.
(Continued)

*Primary Examiner* — Ruiyun Zhang
(74) *Attorney, Agent, or Firm* — Intellectual Valley Law, P.C.

(57) ABSTRACT

The present application discloses a display substrate. The display substrate includes a base substrate; a color filter on the base substrate; and an overcoat layer on a side of the color filter distal to the base substrate. The overcoat layer includes a first sublayer and a second sublayer, the second sublayer on a side of the first sublayer distal to the base substrate. The first sublayer includes a first polymer material. The second sublayer includes a second polymer material different from the first polymer material.

20 Claims, 5 Drawing Sheets

(51) Int. Cl.
  *G02B 5/28* (2006.01)
  *G02F 1/1337* (2006.01)
(52) U.S. Cl.
  CPC .. *G02F 1/133516* (2013.01); *G02F 1/133723* (2013.01); *C09K 2323/00* (2020.08); *C09K 2323/03* (2020.08); *C09K 2323/031* (2020.08); *G02F 2202/022* (2013.01)
(58) Field of Classification Search
  CPC .. G02B 5/28; C09K 2323/00; C09K 2323/03; C09K 2323/031
  USPC ............... 428/1.1, 1.3, 0.131; 349/106, 122; 359/891
  See application file for complete search history.

(56) References Cited

U.S. PATENT DOCUMENTS

2006/0284957 A1 12/2006 Chou et al.
2010/0020275 A1 1/2010 Mima et al.
2015/0030843 A1 1/2015 Yang et al.
2016/0187719 A1 6/2016 Zhang et al.

FOREIGN PATENT DOCUMENTS

| | | |
|---|---|---|
| CN | 102879846 A | 1/2013 |
| CN | 103558711 A | 2/2014 |
| CN | 103360857 B | 1/2015 |
| CN | 106200134 A | 12/2016 |
| JP | 0277724 A | 3/1990 |
| JP | 2004134099 A | 4/2004 |
| WO | 9947900 A1 | 9/1999 |

OTHER PUBLICATIONS

International Search Report & Written Opinion dated Mar. 15, 2018, regarding PCT/CN2017/111291.

DISPLAY SUBSTRATE, DISPLAY APPARATUS, AND METHOD OF FABRICATING DISPLAY SUBSTRATE

CROSS-REFERENCE TO RELATED APPLICATION

This application is a national stage application under 35 U.S.C. § 371 of International Application No. PCT/CN2017/111291, filed Nov. 16, 2017, which claims priority to Chinese Patent Application No. 201710406158.2, filed Jun. 1, 2017, the contents of which are incorporated by reference in the entirety.

TECHNICAL FIELD

The present invention relates to display technology, more particularly, to a display substrate, a display apparatus, and a method of fabricating a display substrate.

BACKGROUND

A liquid crystal display apparatus includes an array substrate and a color filter substrate assembled together, and a liquid crystal layer between the array substrate and the color filter substrate. The liquid crystal layer includes liquid crystal molecules. A liquid crystal display device produces an image by applying an electric field to a liquid crystal layer between the array substrate and the color filter substrate. In response to the electric field applied to the liquid crystal layer, the liquid crystal molecules in the liquid crystal layer rotate. Thus, the electric field changes an alignment direction of the liquid crystal molecules in the liquid crystal layer. Light transmittance of the liquid crystal layer is adjusted when the alignment direction of the liquid crystal molecules changes.

SUMMARY

In one aspect, the present invention provides a display substrate comprising a base substrate; a color filter on the base substrate; and an overcoat layer on a side of the color filter distal to the base substrate; wherein the overcoat layer comprises a first sublayer and a second sublayer, the second sublayer on a side of the first sublayer distal to the base substrate; the first sublayer comprises a first polymer material; and the second sublayer comprises a second polymer material different from the first polymer material.

Optionally, the display substrate further comprises an alignment film on a side of the second sublayer distal to the first sublayer.

Optionally, the first polymer material comprises an acrylic polymer; and the second sublayer comprises a polyimide.

Optionally, the overcoat layer further comprises a third sublayer between the first sublayer and the second sublayer, and the third sublayer comprises a third polymer material different from the first polymer material and the second polymer material.

Optionally, the third polymer material comprises a copolymer of the first polymer material and the second polymer material.

Optionally, the third polymer material comprises a poly-(acrylic-imide) co-polymer.

Optionally, the poly-(acrylic-imide) co-polymer comprises

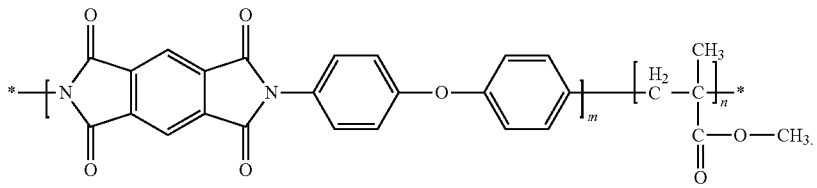

Optionally, the display substrate further comprises a spacer layer on a side of the second sublayer distal to the base substrate.

Optionally, the first sublayer has a thickness in a range of approximately 0.6 μm to approximately 1.5 μm; the second sublayer has a thickness in a range of approximately 0.6 μm to approximately 1.5 μm; and the overcoat layer has a thickness in a range of approximately 1.2 μm to approximately 3.0 μm.

In another aspect, the present invention provides a display apparatus comprising the display substrate described herein or fabricated by a method described herein.

In another aspect, the present invention provides a method of fabricating a display substrate comprising forming a color filter on a base substrate; and forming an overcoat layer on a side of the color filter distal to the base substrate; wherein forming the overcoat layer comprises forming a first sublayer and forming a second sublayer subsequent to forming the first sublayer, the second sublayer formed on a side of the first sublayer distal to the base substrate; the first sublayer is formed to comprise a first polymer material; and the second sublayer is formed to comprise a second polymer material different from the first polymer material.

Optionally, subsequent to forming the second sublayer, further comprising forming an alignment film on a side of the second sublayer distal to the first sublayer.

Optionally, forming the overcoat layer comprises forming a first polymer material layer comprising a first polymer material on a side of the color filter distal to the base substrate; drying the first polymer material layer, forming a second polymer material layer comprising a second polymer material on a side of the first polymer material layer distal to the base substrate; drying the second polymer material layer; and curing the first polymer material layer and the second polymer material layer thereby forming the first sublayer and the second sublayer.

Optionally, curing the first polymer material layer and the second polymer material layer comprises pre-curing the first polymer material layer and the second polymer material layer at a temperature in a range of approximately 50 degrees to approximately 80 degrees for a duration in a range of approximately 50 seconds to approximately 150 seconds; and subsequent to pre-curing the first polymer material layer and the second polymer material layer, curing the first polymer material layer and the second polymer material layer at a temperature in a range of approximately 200 degrees to approximately 250 degrees for a duration in a range of approximately 15 minutes to approximately 30 minutes.

Optionally, the first polymer material layer comprises an acrylic polymer and the second polymer material layer comprises a polyimide.

Optionally, the first polymer material layer further comprises an epoxy resin and the second polymer material layer further comprises an epoxy resin.

Optionally, forming the overcoat layer further comprises forming a third sublayer between the first sublayer and the second sublayer; and the third sublayer is formed to comprise a third polymer material different from the first polymer material and the second polymer material.

Optionally, forming the third sublayer comprises co-polymerizing the first polymer material and the second polymer material at an interface between the first polymer material layer and the second polymer material layer during curing the overcoat layer; and the third polymer material comprises a co-polymer of the first polymer material and the second polymer material.

Optionally, the third polymer material comprises a poly-(acrylic-imide) co-polymer.

Optionally, the poly-(acrylic-imide) co-polymer comprises

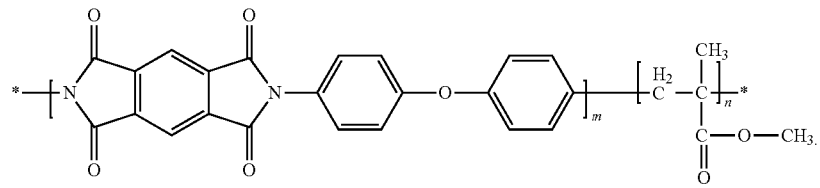

Optionally, curing the first polymer material layer is performed using one or a combination of an epoxy curing agent, a silane coupling agent, and a surfactant; and curing the second polymer material layer is performed using one or a combination of an epoxy curing agent, a silane coupling agent, and a surfactant.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In a process of fabricating a conventional display substrate (e.g., a color filter substrate), a black matrix and a color filter is formed on a base substrate, an overcoat layer is formed on a side of the color filter distal to the base substrate, a spacer layer and an alignment film is then formed on a side of the overcoat layer distal to the base substrate. Typically, the alignment film is made of polyimide. The step of forming the alignment film typically includes coating the polyimide dissolved in an organic solvent such as 1-Methyl-2-pyrrolidone. The organic solvent in the alignment film may permeate through the overcoat layer and dissolve the pigments contained in the color filter. The dissolved pigments then permeate out of the overcoat layer. When the display substrate is assembled with an array substrate in a cell, the permeated pigments will contaminate the liquid crystal molecule layer in the assembled display apparatus, resulting in spackle defects in the display apparatus. The contamination process becomes more severe in the subsequent fabricating processes, some of which are performed at an elevated temperature.

Accordingly, the present disclosure provides, inter alia, a display substrate, a display apparatus, and a fabricating method thereof that substantially obviate one or more of the problems due to limitations and disadvantages of the related art. In one aspect, the present disclosure provides a display substrate. In some embodiments, the display substrate includes a base substrate; a color filter on the base substrate; and an overcoat layer on a side of the color filter distal to the base substrate. Optionally, the overcoat layer includes a first sublayer and a second sublayer, the second sublayer on a side of the first sublayer distal to the base substrate. Optionally, the first sublayer comprises a first polymer material; and the second sublayer comprises a second polymer material different from the first polymer material.

Figure 1:
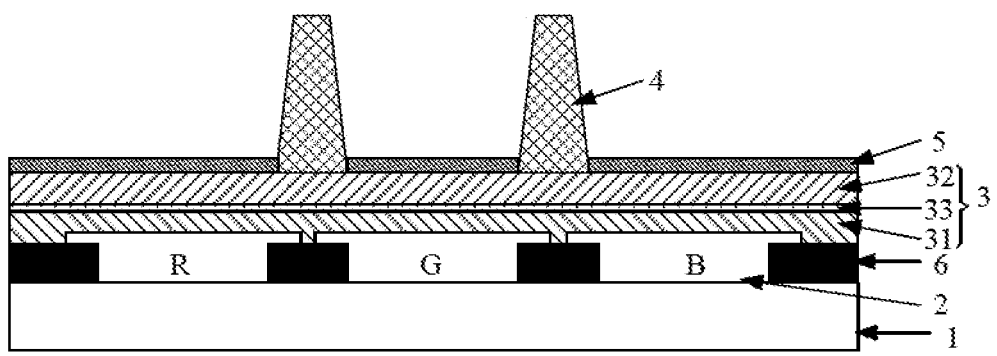
FIG. 1 is a diagram illustrating the structure of a display substrate in some embodiments of the present disclosure.
Figure 2:
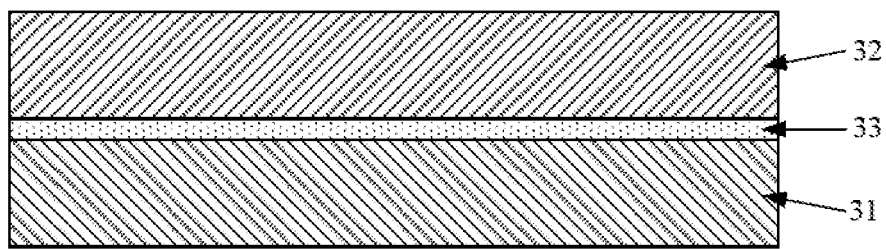
FIG. 2 is a diagram illustrating the structure of an overcoat layer in some embodiments of the present disclosure.

FIG. 1 is a diagram illustrating the structure of a display substrate in some embodiments of the present disclosure. Referring to FIG. 1, the display substrate in some embodiments includes a base substrate 1; a color filter 2 on the base substrate 1; and an overcoat layer 3 on a side of the color filter 2 distal to the base substrate 1. The color filter 2 in some embodiments includes a plurality of color filter blocks, e.g., a red color filter block R, a green color filter block G, and a blue color filter block B. Optionally, the display substrate further includes a black matrix 6 in an inter-subpixel region of the display substrate. The black matrix 6 defines a plurality of subpixel regions of the display substrate. The plurality of color filter blocks occupy the plurality of subpixel regions.

The overcoat layer 3 is on a side of the color filter 2 distal to the base substrate 1. In some embodiments, the overcoat layer 3 includes a first sublayer 31 and a second sublayer 32, the second sublayer 32 on a side of the first sublayer 21 distal to the base substrate 1.

In some embodiments, the display substrate further includes an alignment film 5 on a side of the second sublayer 32 distal to the first sublayer 31. In a liquid crystal display apparatus assembled using the display substrate, the alignment film 5 is used to pre-align the liquid crystal molecules in the liquid crystal display apparatus. For example, a plurality of microgrooves may be formed in the alignment film 5 to induce the liquid crystal molecules in the liquid crystal display apparatus to align in a certain direction.

In some embodiments, the first sublayer 31 is in contact with the color filter 2, and the second sublayer 32 is in contact with the alignment film 5. Optionally, the first sublayer 31 is configured to prevent pigments in the color filter 2 from permeating out of the overcoat layer 3. Optionally, the second sublayer 32 is configured to achieve an enhanced adhesion between the overcoat layer 3 and the alignment film 5.

In the present display substrate, the overcoat layer 3 includes at least two sublayers, a first sublayer 31 and a second sublayer 32. The first sublayer 31 includes a first material capable of effectively preventing pigments in the color filter 2 from permeating out of the overcoat layer 3, thereby avoiding defects in the liquid crystal display apparatus having the display substrate caused by leakage of the color filter pigments into the liquid crystal molecule layer in the liquid crystal display apparatus. The second sublayer 32 includes a second material having an enhanced adhesivity with the alignment film 5. By having the second sublayer 32, various layers including the first sublayer 31, the second sublayer 32, and the alignment film 5 can be adhered together tightly, achieving an enhanced hermeticity of the liquid crystal display apparatus, enhanced reliability under high-temperature and high-humidity environment, and enhance moist-resistance and oxygen-resistance.

In some embodiments, the first polymer material includes an acrylic polymer. Optionally, the first sublayer 31 further includes an epoxy resin. Optionally, the acrylic polymer is a polymer or copolymer of acrylic monomers such as acrylate, acrylic acid, and acrylic anhydride. Examples of the acrylic monomer for making the acrylic polymer include, but are not limited to, methylmethacrylate, ethylmethacrylate, propylmethacrylate, butylmethacrylate, pentylmethacrylate, hexylmethacrylate, cyclohexylmethacrylate, heptylmethacrylate, octylmethacrylate, nonylmethacrylate, decylmethacrylate, laurylmethacrylate, dodecylmethacrylate, tetradecylmethacrylate, hexadecylmethacrylate, isobornylmethacrylate, adamantylmethacrylate, dicyclopentanylmethacrylate, dicyclopeutenylmethacrylate, benzylmethacrylate, 2-methoxyethylmethacrylate, 2-ethoxyethylmethacryate, acrylic acid, methacrylic acid, itaconic acid, maleic acid, maleic anhydride, maleic acid monoalkyl ester, monoalkyl itaconate, monoalkyl fumarate, glycidylacrylate, glycidyl methacrylate, 3,4-epoxybutylmethacrylate, 2,3-epoxycyclohexyl methacrylate, 3,4-epoxycyclohexyhnethylmethacrylate, 3-methyl oxetane-3-methylmethacrylate, and 3-ethyloxetane-3-methylmethacrylate. Optionally, the acrylic polymer may be a copolymer obtained by polymerization of the above-mentioned acrylic monomers with one or more monomers of styrene, α-methylstyrene, acetoxystyrene, N-methylmaleimide, N-ethylmaleimide, N-propylmaleimide, N-butylmaleimide, N-cyclohexylmaleimide, methacrylamide, and N-methyl methacrylamide. Polymerization of the acrylic monomers can be performed by, e.g., heat, irradiation, and cross-linking.

In some embodiments, the second polymer material includes a polyimide. Examples of polyimides include polyimides composed of acid anhydrides such as pyromellitic dianhydride, biphenyltetracarboxylic dianhydride or 2,2'-[4,4'-di(dicarboxyphenyloxy)phenyl] propane dianhydride, and diamines such as oxydiamine, paraphenylenediamine, metaphenylenediamine or benzophenonediamine. Further examples of polyimides include pyromellitic dianhydride, oxydianiline, polymers of benzophenonetetracarboxylic dianhydride and oxydianiline and/or 1,3-phenylenediamine and the polymer of 3,3'-biphenylenetetracarboxylic acid and 1,4-phenyleuediamice, Kapton and Vespel resins sold by Du Pont, Matrimide 5218 sold by Ciba-Geigy, LaRC-TPI sold by Mitsui Toatsu or Upilex® sold by Ube Industries, Apical® sold by Allied Corporation, and PIQ-L100 sold by Hitachi Chemical Company. Polyimides have an enhanced adhesivity with the alignment film 5. Optionally, the second sublayer 32 further includes an epoxy resin. By including the epoxy resin in the second sublayer 32, the adhesion between the second sublayer 32 and the first sublayer 31, and between the second sublayer 32 and the alignment film 5, can be further enhanced.

Referring to FIG. 1, the overcoat layer 3 in some embodiments further includes a third sublayer 33 between the first sublayer 31 and the second sublayer 32. Optionally, the third sublayer 33 includes a third polymer material different from the first polymer material and the second polymer material. Optionally, the third polymer material includes a co-polymer of the first polymer material and the second polymer material. Optionally, the third polymer material includes a poly-(acrylic-imide) co-polymer. Optionally, the poly-(acrylic-imide) co-polymer includes

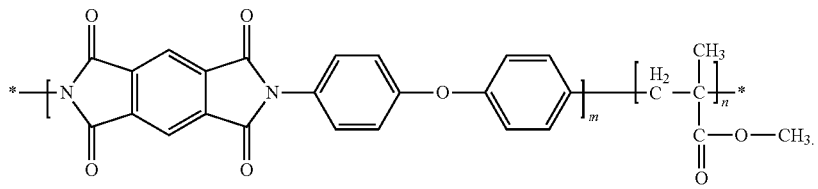

Optionally, at an interface between the first sublayer 31 and the second sublayer 32, the first polymer material (e.g., an acrylic polymer), the second polymer material (e.g., a polyimide), and optionally the epoxy resin, co-polymerize to form the third polymer material. By having the third sublayer 33, the adhesion between the first sublayer 31 and the second sublayer 32 can be further enhanced.

Optionally, the first sublayer 31 further includes one or a combination of an epoxy curing agent, a silane coupling agent, and a surfactant. Optionally, the second sublayer 32 further includes one or a combination of an epoxy curing agent, a silane coupling agent, and a surfactant.

In some embodiments, the first sublayer 31 has a thickness in a range such that permeation of pigments through the overcoat layer 3 can be effectively prevented and at the same time light transmittance and a total thickness of the display substrate is not significantly compromised. Optionally, the first sublayer 31 has a thickness in a range of approximately 0.6 μm to approximately 1.5 μm, e.g., approximately 0.8 μm to approximately 1.2 μm, approximately 0.9 μm to approximately 1.1 μm, and approximately 1.0 μm.

In some embodiments, the second sublayer 32 has a thickness in a range such that sufficient adhesion between the second sublayer 32 and the adjacent layers (e.g., the alignment film 5) can be achieved and at the same time light transmittance and a total thickness of the display substrate is not significantly compromised. Optionally, the second sublayer 32 has a thickness in a range of approximately 0.6 μm to approximately 1.5 μm, e.g., approximately 0.8 μm to approximately 1.2 μm, approximately 0.9 μm to approximately 1.1 μm, and approximately 1.0 μm.

Optionally, the overcoat layer 3 has a total thickness in a range of approximately 1.2 μm to approximately 3.0 μm, e.g., approximately 1.6 μm to approximately 2.4 μm, approximately 1.8 μm to approximately 2.2 μm, and approximately 2.0 μm.

In some embodiments, the display substrate further includes a spacer layer 4 on a side of the second sublayer 32 distal to the base substrate 1. The spacer layer 4 is configured to spaced apart the display substrate and another substrate (e.g., an array substrate) facing the display substrate by a distance. Optionally, an orthographic projection of the spacer layer 4 on the base substrate 1 is covered by an orthographic projection of the black matrix 6.

Figure 3:
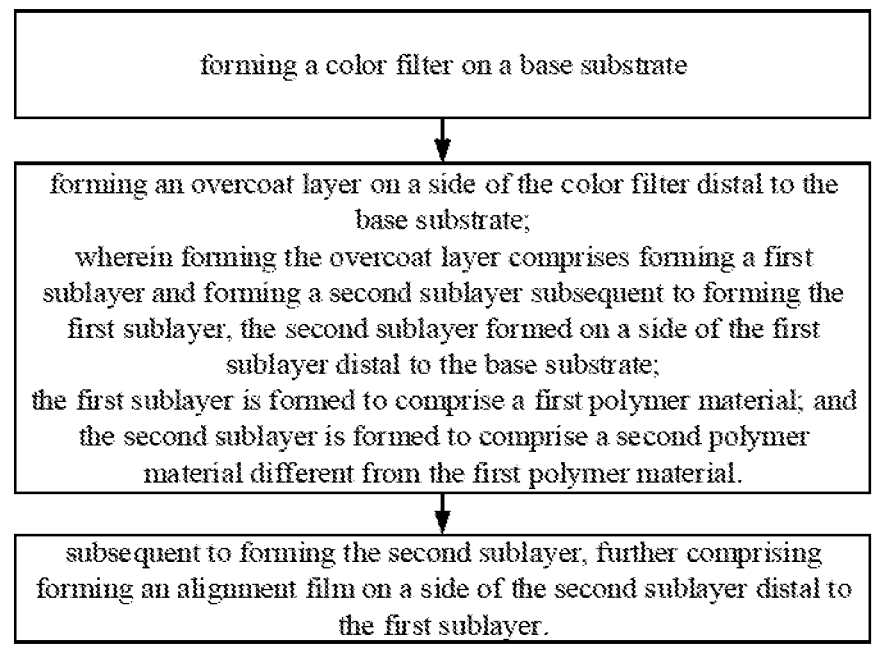
FIG. 3 is a flow chart illustrating a method of fabricating a display substrate in some embodiments of the present disclosure.

In another aspect, the present disclosure provides a method of fabricating a display substrate. FIG. 3 is a flow chart illustrating a method of fabricating a display substrate in some embodiments of the present disclosure. Referring to FIG. 3, the method in some embodiments includes forming a color filter on a base substrate; and forming an overcoat layer on a side of the color filter distal to the base substrate. Optionally, forming the overcoat layer includes forming a first sublayer and forming a second sublayer subsequent to forming the first sublayer, the second sublayer formed on a side of the first sublayer distal to the base substrate. The first sublayer is formed to comprise a first polymer material. The second sublayer is formed to comprise a second polymer material different from the first polymer material. Optionally, subsequent to forming the second sublayer, the method further includes forming an alignment film on a side of the second sublayer distal to the first sublayer.

Optionally, the first sublayer is formed to be in contact with the color filter, and the second sublayer is formed to be in contact with the alignment film. Optionally, the alignment film is formed to be in contact with the second sublayer. Optionally, the first sublayer is formed to prevent pigments in the color filter from permeating out of the overcoat layer. Optionally, the second sublayer is formed to achieve an enhanced adhesion between the overcoat layer and the alignment film. Optionally, the second sublayer is formed using a same material as that of the alignment film.

Optionally, the step of forming the alignment film includes coating the display substrate with an alignment material layer, curing the alignment material layer, and aligning the alignment material layer thereby forming the alignment film. Optionally, the step of aligning the alignment material layer is performed by rubbing the alignment material layer. Optionally, the step of aligning the alignment material layer is performed by a photo-alignment process.

In a display substrate fabricated by the present method, the overcoat layer is formed to include at least two sublayers, a first sublayer and a second sublayer. The first sublayer includes a first material capable of effectively preventing pigments in the color filter from permeating out of the overcoat layer, thereby avoiding defects in the liquid crystal display apparatus having the display substrate caused by leakage of the color filter pigments into the liquid crystal molecule layer in the liquid crystal display apparatus. The second sublayer includes a second material having an enhanced adhesivity with the alignment film. By forming the second sublayer, various layers including the first sublayer, the second sublayer, and the alignment film can be adhered together tightly, achieving an enhanced hermeticity of the liquid crystal display apparatus, enhanced reliability under high-temperature and high-humidity environment, and enhance moist-resistance and oxygen-resistance.

Figure 4:
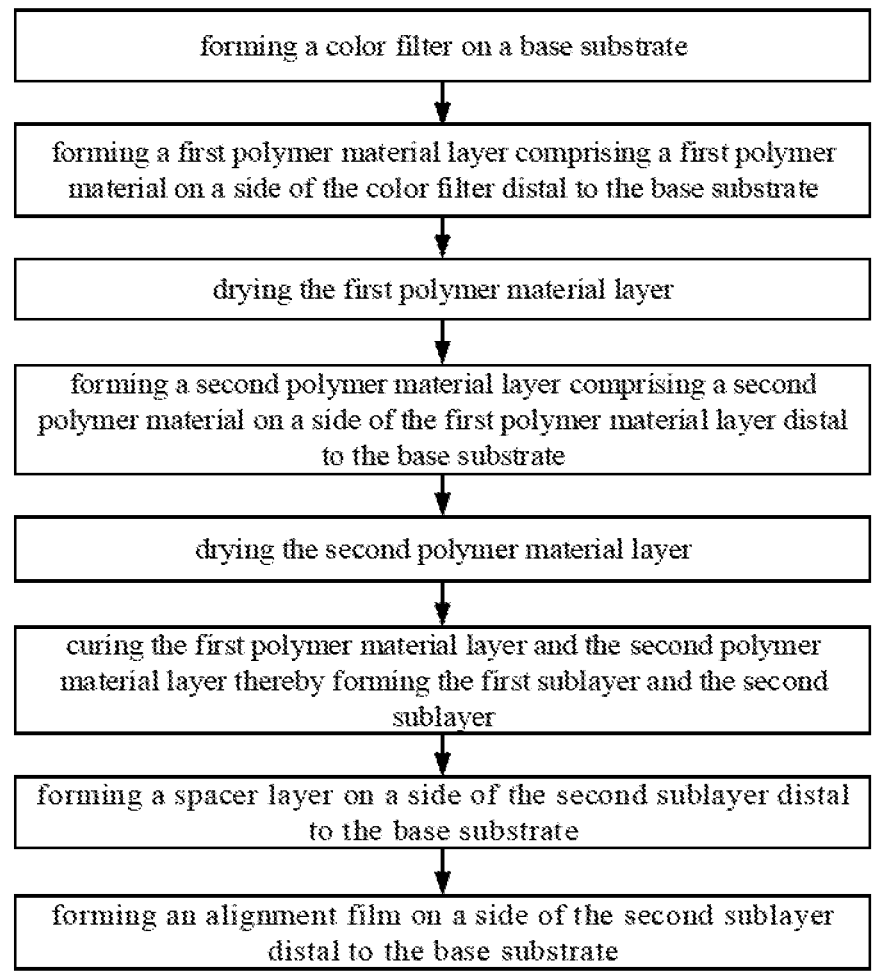
FIG. 4 is a flow chart illustrating a method of fabricating a display substrate in some embodiments of the present disclosure.

FIG. 4 is a flow chart illustrating a method of fabricating a display substrate in some embodiments of the present disclosure. Referring to FIG. 4, the method in some embodiments includes forming a color filter on a base substrate; forming a first polymer material layer comprising a first polymer material on a side of the color filter distal to the base substrate; drying the first polymer material layer; forming a second polymer material layer comprising a second polymer material on a side of the first polymer material layer distal to the base substrate; drying the second polymer material layer; curing the first polymer material layer and the second polymer material layer thereby forming the first sublayer and the second sublayer; forming a spacer layer on a side of the second sublayer distal to the base substrate; and forming an alignment film on a side of the second sublayer distal to the base substrate. Optionally, curing the first polymer material layer is performed using one or a combination of an epoxy curing agent, a silane coupling agent, and a surfactant. Optionally, curing the second polymer material layer is performed using one or a combination of an epoxy curing agent, a silane coupling agent, and a surfactant.

Figure 5A:
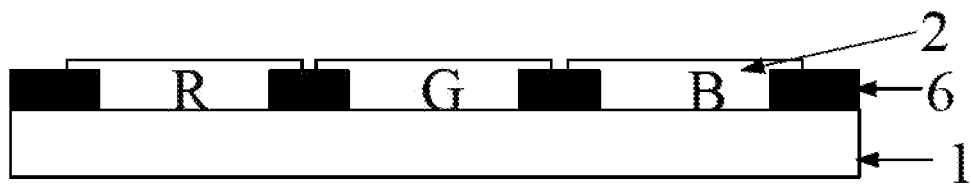
FIGS. 5A to 5G illustrate a process of fabricating a display substrate in some embodiments of the present disclosure.

FIGS. 5A to 5G illustrate a process of fabricating a display substrate in some embodiments of the present disclosure. Referring to FIG. 5A, a black matrix 6 is formed in an inter-subpixel region of the display substrate. The black matrix 6 defines a plurality of subpixel regions of the display substrate. A color filter 2 is then form on the base substrate 1. The color filter 2 is formed to include a plurality of color filter blocks, e.g., a red color filter block R, a green color filter block G, and a blue color filter block B. The plurality of color filter blocks is formed to occupy the plurality of subpixel regions.

Figure 5B:
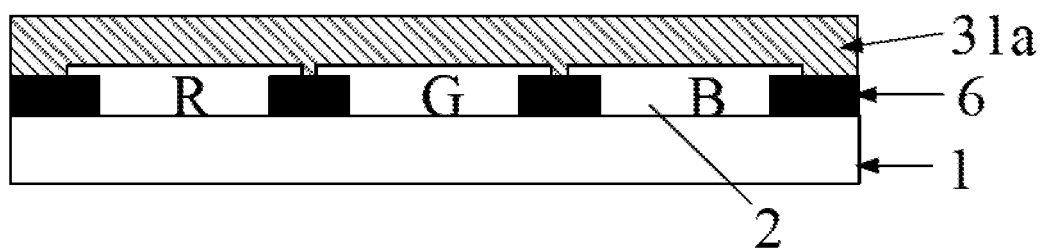

Referring to FIG. 5B, subsequent to forming the color filter 2, a first polymer material layer 31a including a first polymer material is formed on a side of the color filter 2 distal to the base substrate 1. The first polymer material is capable of effectively preventing pigments in the color filter 2 from permeating out of an overcoat layer to be formed in the display substrate, thereby avoiding defects in the liquid crystal display apparatus having the display substrate caused by leakage of the color filter pigments into the liquid crystal molecule layer in the liquid crystal display apparatus. Optionally, the first polymer material includes an acrylic polymer. Optionally, the first polymer material layer 31a further includes an epoxy resin. Optionally, the first polymer material layer 31a has a thickness in a range of approximately 1.0 μm to approximately 2.0 μm. e.g., approximately 1.2 μm to approximately 1.8 μm, approximately 1.4 μm to approximately 1.6 μm, and approximately 1.5 μm.

Figure 5C:
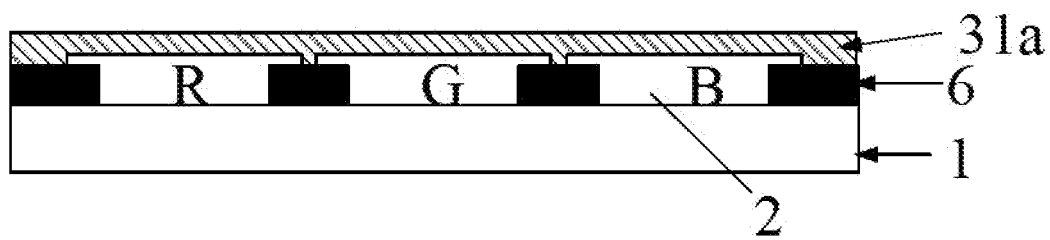

Referring to FIG. 5C, subsequent to forming the first polymer material layer 31a, the first polymer material layer 31a is dried, e.g., in a vacuum dryer, to remove excess solvent in the first polymer material layer 31a. Subsequent to drying the first polymer material layer 31a, the thickness of the first polymer material layer 31a reduces. By having a drying step, the first polymer material layer 31a will have a reduced mobility, e.g., the drying step prevents the first polymer material layer 31a from freely flowing in the subsequent coating process (e.g., coating a second polymer material layer on top of the first polymer material layer 31a).

Figure 5D:
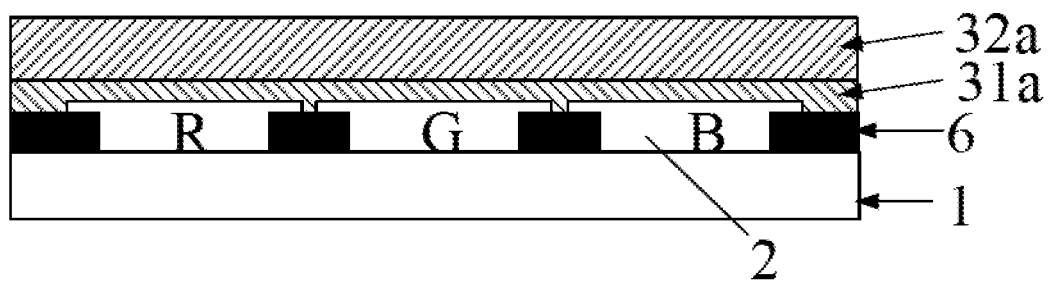

Referring to FIG. 5D, subsequent to drying the first polymer material layer 31a, a second polymer material layer 32a including a second polymer material is formed on a side of the first polymer material layer 31a distal to the base substrate 1. The second polymer material has an enhanced adhesivity with the alignment film to be formed in the display substrate. Optionally, the second polymer material includes a polyimide. Polyimides have an enhanced adhesivity with the alignment film to be formed in the display substrate. Optionally, the second polymer material layer 32a further includes an epoxy resin. Optionally, the second polymer material layer 32a has a thickness in a range of approximately 1.0 μm to approximately 2.0 μm, e.g., approximately 1.2 μm to approximately 1.8 μm, approximately 1.4 μm to approximately 1.6 μm, and approximately 1.5 μm.

Figure 5E:
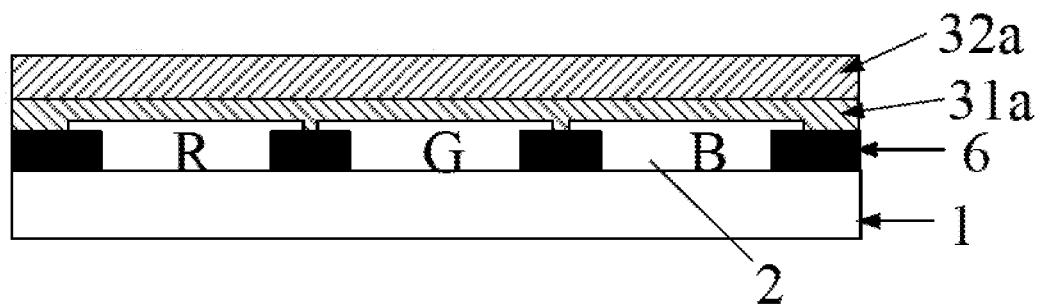

Referring to FIG. 5E, subsequent to forming the second polymer material layer 32a, the second polymer material layer 32a is dried, e.g., in a vacuum dryer, to remove excess solvent in the second polymer material layer 32a. Subsequent to drying the second polymer material layer 32a, the thickness of the second polymer material layer 32a reduces.

Figure 5F:
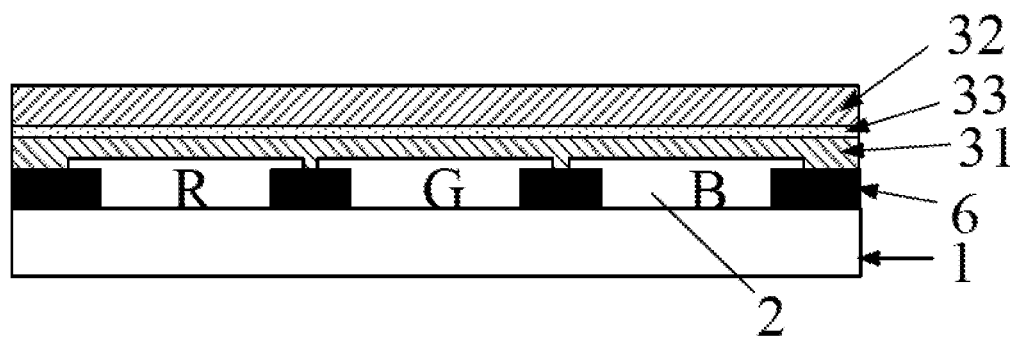

Referring to FIG. 5F, subsequent to drying the second polymer material layer 32a, the first polymer material layer 31a and the second polymer material layer 32a are then cured to form the first sublayer 31 and the second sublayer 32. In some embodiments, the step of curing the first polymer material layer 31a and the second polymer material layer 32a includes pre-curing the first polymer material layer 31a and the second polymer material layer 32a at a relatively lower temperature, followed by curing the first polymer material layer 31a and the second polymer material layer 32a at an elevated temperature. Optionally, the step of curing the first polymer material layer 31a and the second polymer material layer 32a includes pre-curing the first polymer material layer 31a and the second polymer material layer 32a at a temperature in a range of approximately 50 degrees to approximately 80 degrees for a duration in a range of approximately 50 seconds to approximately 150 seconds; and curing the first polymer material layer 31a and the second polymer material layer 32a at a temperature in a range of approximately 200 degrees to approximately 250 degrees for a duration in a range of approximately 15 minutes to approximately 30 minutes.

In some embodiments, the step of forming the overcoat layer further includes forming a third sublayer 33 between the first sublayer 31 and the second sublayer 32. The third sublayer 33 is formed to include a third polymer material different from the first polymer material and the second polymer material. Referring to FIG. 5F, in some embodiments, the step of forming the third sublayer 33 includes co-polymerizing the first polymer material and the second polymer material at an interface between the first polymer material layer 31a and the second polymer material layer 32a during the step of curing the first polymer material layer 31a and the second polymer material layer 32a. The third polymer material is formed to include a co-polymer of the first polymer material and the second polymer material. Optionally, the third polymer material is formed to include a co-polymer of the first polymer material and the second polymer material. Optionally, the third polymer material includes a poly-(acrylic-imide) co-polymer. Optionally, the poly-(acrylic-imide) co-polymer includes

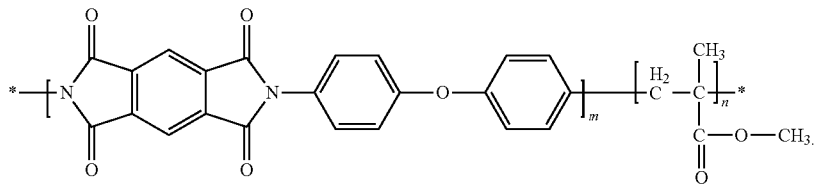

Figure 5G:
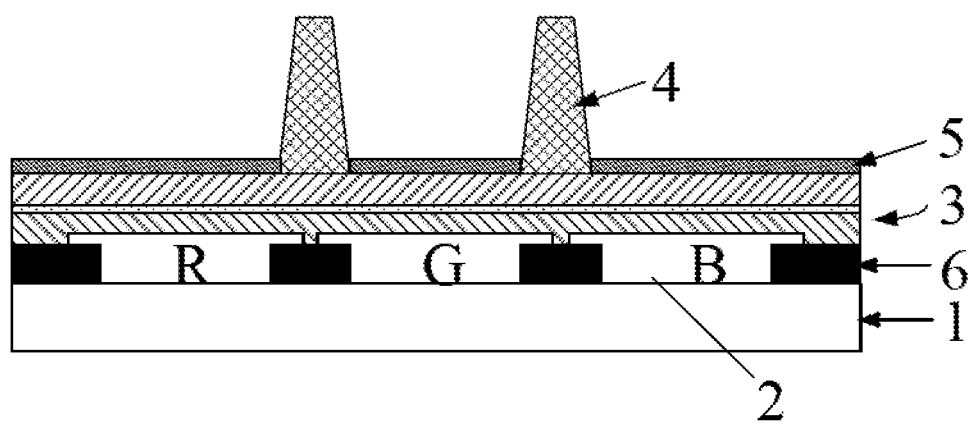

Referring to FIG. 5F and FIG. 5G, subsequent to the step of curing the first polymer material layer 31a and the second polymer material layer 32a, the first sublayer 31 and the second sublayer 32 are formed. Optionally, the first sublayer 31 is formed to have a thickness in a range of approximately 0.6 un to approximately 1.5 μm, e.g., approximately 0.8 μm to approximately 1.2 μm, approximately 0.9 μm to approximately 1.1 μm, and approximately 1.0 μm. Optionally, the second sublayer 32 is formed to have a thickness in a range of approximately 0.6 μm to approximately 1.5 μm, e.g., approximately 0.8 μm to approximately 1.2 μm, approximately 0.9 μm to approximately 1.1 μm, and approximately 1.0 μm. Optionally, the overcoat layer 3 has a total thickness in a range of approximately 1.2 μm to approximately 3.0 μm, e.g., approximately 1.6 μm to approximately 2.4 μm, approximately 1.8 μm to approximately 2.2 μm, and approximately 2.0 μm.

Referring to FIG. 5G, subsequent to forming the overcoat layer 3, a spacer layer 4 is formed on a side of the overcoat layer 3 distal to the base substrate 1. Optionally, an alignment film 5 is formed on a side of the overcoat layer 3 distal to the base substrate 1.

In another aspect, the present disclosure provides a display apparatus having the display substrate described herein or fabricated by a method described herein. Examples of appropriate display apparatuses includes, but are not limited to, an electronic paper, a mobile phone, a tablet computer, a television, a monitor, a notebook computer, a digital album, a GPS, etc. Optionally, the display apparatus is a liquid crystal display apparatus. Optionally, the display apparatus is an organic light emitting diode display apparatus.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention". "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display substrate, comprising:
   a base substrate;
   a color filter on the base substrate; and
   an overcoat layer on a side of the color filter distal to the base substrate;
   wherein the overcoat layer comprises a first sublayer and a second sublayer, the second sublayer on a side of the first sublayer distal to the base substrate;
   the first sublayer comprises a first polymer material; and
   the second sublayer comprises a second polymer material different from the first polymer material;
   a third sublayer between the first sublayer and the second sublayer;
   wherein the third sublayer comprises a cross-linked polymer comprising the first polymer material and the second polymer material;
   wherein the display substrate further comprises an alignment film on a side of the second sublayer distal to the first sublayer; and
   the second sublayer is in direct contact with the alignment film.

2. The display substrate of claim 1, wherein the first polymer material comprises an acrylic polymer; and
   the second sublayer comprises a polyimide.

3. The display substrate of claim 1, wherein the third sublayer comprises a cross-linked polymer comprising an acrylic polymer and a polyimide.

4. The display substrate of claim 1, further comprising a spacer layer on a side of the second sublayer distal to the base substrate.

5. The display substrate of claim 1, wherein the first sublayer has a thickness in a range of approximately 0.6 µm to approximately 1.5 µm;
   the second sublayer has a thickness in a range of approximately 0.6 µm to approximately 1.5 µm; and
   the overcoat layer has a thickness in a range of approximately 1.2 µm to approximately 3.0 µm.

6. A display apparatus, comprising the display substrate of claim 1.

7. The display substrate of claim 1, wherein an orthographic projection of the first sublayer on the base substrate completely covers an orthographic projection of the color filter on the base substrate;
   an orthographic projection of the second sublayer on the base substrate completely covers an orthographic projection of the color filter on the base substrate; and
   an orthographic projection of the third sublayer on the base substrate completely covers an orthographic projection of the color filter on the base substrate.

8. A method of fabricating a display substrate, comprising:
   forming a color filter on a base substrate; and
   forming an overcoat layer on a side of the color filter distal to the base substrate;
   wherein forming the overcoat layer comprises forming a first sublayer, forming a second sublayer subsequent to forming the first sublayer, the second sublayer formed on a side of the first sublayer distal to the base substrate, and forming a third sublayer between the first sublayer and the second sublayer;
   the first sublayer is formed to comprise a first polymer material; and
   the second sublayer is formed to comprise a second polymer material different from the first polymer material; and
   wherein forming the third sublayer comprises cross-linking the first polymer material and the second polymer material; and
   the third sublayer comprises a cross-linked polymer comprising the first polymer material and the second polymer material;
   subsequent to forming the second sublayer, the method further comprises forming an alignment film on a side of the second sublayer distal to the first sublayer; and
   the second sublayer is in direct contact with the alignment film.

9. The method of claim 8, wherein forming the overcoat layer comprises:
   forming a first polymer material layer comprising a first polymer material on a side of the color filter distal to the base substrate;
   drying the first polymer material layer;
   forming a second polymer material layer comprising a second polymer material on a side of the first polymer material layer distal to the base substrate;
   drying the second polymer material layer; and
   curing the first polymer material layer and the second polymer material layer thereby forming the first sublayer and the second sublayer.

10. The method of claim 9, wherein curing the first polymer material layer and the second polymer material layer comprises:
    pre-curing the first polymer material layer and the second polymer material layer at a temperature in a range of approximately 50 degrees to approximately 80 degrees for a duration in a range of approximately 50 seconds to approximately 150 seconds; and
    subsequent to pre-curing the first polymer material layer and the second polymer material layer, curing the first polymer material layer and the second polymer material layer at a temperature in a range of approximately 200 degrees to approximately 250 degrees for a duration in a range of approximately 15 minutes to approximately 30 minutes.

11. The method of claim 9, wherein the first polymer material layer comprises an acrylic polymer and the second polymer material layer comprises a polyimide.

12. The method of claim 11, wherein the first polymer material layer further comprises an epoxy resin and the second polymer material layer further comprises an epoxy resin.

13. The method of claim 8, wherein the third sublayer comprises a cross-linked polymer comprising an acrylic polymer and a polyimide.

14. The display substrate of claim 8, wherein an orthographic projection of the first sublayer on the base substrate completely covers an orthographic projection of the color filter on the base substrate;
an orthographic projection of the second sublayer on the base substrate completely covers an orthographic projection of the color filter on the base substrate; and
an orthographic projection of the third sublayer on the base substrate completely covers an orthographic projection of the color filter on the base substrate.

15. A display substrate, comprising:
a base substrate;
a color filter on the base substrate; and
an overcoat layer on a side of the color filter distal to the base substrate;
wherein the overcoat layer comprises a first sublayer and a second sublayer, the second sublayer on a side of the first sublayer distal to the base substrate;
the first sublayer comprises a first polymer material; and
the second sublayer comprises a second polymer material different from the first polymer material;
a third sublayer between the first sublayer and the second sublayer;
wherein the third sublayer comprises:
one or a combination of a curing agent, a coupling agent, and a surfactant; and
a cross-linked polymer comprising the first polymer material and the second polymer material.

16. The display substrate of claim 15, further comprising an alignment film on a side of the second sublayer distal to the first sublayer.

17. The display substrate of claim 15, wherein the first polymer material comprises an acrylic polymer; and
the second sublayer comprises a polyimide.

18. The display substrate of claim 15, wherein the third sublayer comprises a cross-linked polymer comprising an acrylic polymer and a polyimide.

19. The display substrate of claim 16, wherein the second sublayer is in direct contact with the alignment film.

20. The display substrate of claim 15, further comprising a spacer layer on a side of the second sublayer distal to the base substrate.

* * * * *